(12) United States Patent
Lui et al.

(10) Patent No.: US 11,967,105 B2
(45) Date of Patent: *Apr. 23, 2024

(54) SYSTEM AND METHOD FOR GENERATING RECOMMENDATIONS DURING IMAGE CAPTURE OF A PRODUCT

(71) Applicant: Shopify Inc., Ottawa (CA)

(72) Inventors: Benjamin Lui, Mississauga (CA); Guduru Sai Nihas, Ottawa (CA); Salim Batlouni, Ottawa (CA)

(73) Assignee: Shopify Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/164,733

(22) Filed: Feb. 6, 2023

(65) Prior Publication Data

US 2023/0186513 A1 Jun. 15, 2023

Related U.S. Application Data

(63) Continuation of application No. 17/111,712, filed on Dec. 4, 2020, now Pat. No. 11,645,776.

(51) Int. Cl.
*G06T 7/73* (2017.01)
*G06T 7/50* (2017.01)
*H04L 65/612* (2022.01)
*H04L 65/65* (2022.01)

(52) U.S. Cl.
CPC ............... *G06T 7/73* (2017.01); *G06T 7/50* (2017.01); *H04L 65/612* (2022.05); *H04L 65/65* (2022.05)

(58) Field of Classification Search
CPC ........... G06T 7/73; G06T 7/50; H04L 65/612; H04L 65/65; G06Q 30/0276;
(Continued)

(56) References Cited

U.S. PATENT DOCUMENTS 11,645,776 B2* 5/2023 Lui .................. H04N 1/00169
382/103
2018/0316854 A1 11/2018 Chan et al.
2022/0180551 A1 6/2022 Lui et al.

FOREIGN PATENT DOCUMENTS

CN 106599880 4/2017
CN 110149475 A 8/2019
(Continued)

OTHER PUBLICATIONS

Chusen; Mobile Visul Clothing Search; 2013, IEEE ISBN:978-1-4799-1604-7.
(Continued)

*Primary Examiner* — Jerome Grant, II
(74) *Attorney, Agent, or Firm* — Rowand LLP

(57) ABSTRACT

A system and method are provided. The method comprises obtaining a camera live stream from a camera in a user device, the camera live stream including image data of a particular product; determining one or more image features common to images of one or more products based at least on image analysis of image data of the images of the one or more products; comparing the one or more image features to one or more image features of the image data of the particular product to generate one or more potential adjustments to the one or more image features of the image data of the particular product; and providing, for presentation together with the camera live stream on the user device, at least one indication based on the one or more potential adjustments to the one or more image features of the image data of the particular product.

20 Claims, 12 Drawing Sheets

(58) Field of Classification Search
CPC ........... G06Q 30/0643; G06Q 30/0631; G06Q 30/0641; H04N 1/00159; H04N 1/00161; H04N 1/00169; H04N 1/00183; H04N 23/632; H04N 23/633; H04N 23/64; H04N 1/00244; G06F 3/0484; G06F 3/0487; G06V 10/40; G06V 10/75
USPC ......................................................... 382/103
See application file for complete search history.

(56) References Cited

FOREIGN PATENT DOCUMENTS

| | | |
|---|---|---|
| CN | 110493517 | 11/2019 |
| CN | 112330634 | 2/2021 |
| EP | 3654625 | 5/2020 |
| WO | 2005076167 | 8/2005 |
| WO | 2013075295 | 5/2013 |

OTHER PUBLICATIONS

IPO: Indian Examiner's Report relating to IN application No. 202124018854, dated Apr. 17, 2022.
SIPO: CN Office Action relating to CN application No. 202110441048.6, dated Dec. 9, 2023.
CIPO: CA Office Action relating to CA application No. 3, 114, 145, dated Dec. 28, 2023.
EPO: Extended European Search Report relating to EP application No. 21166115.2, dated Jan. 9, 2021.

* cited by examiner

FIG. 2

| Baseline Image Feature | Average Value | Threshold |
|---|---|---|
| Image resolution | 15 megapixels | 0.5 megapixels |
| Image brightness (as a percentage of maximum brightness) | 55% | 1% |
| Depth of field | 21 cm | 1 cm |
| Focal point (relative to the front surface of the mug) | 0.5 cm | 0.05 cm |
| Size of the mug (as a percentage of pixels occupied by the mug) | 70% | 2% |
| Tilt of the mug (relative to the horizontal) | 0.2° | 0.01° |
| Azimuthal angle of the mug (relative to the location of the hangle of the mug) | 91° | 1° |
| Contrast (ratio of the brightness of the mug to the brightness of the background) | 2:1 | 0.05 |

SYSTEM AND METHOD FOR GENERATING RECOMMENDATIONS DURING IMAGE CAPTURE OF A PRODUCT

CROSS-REFERENCE TO RELATED APPLICATIONS

This application is a continuation of U.S. patent application Ser. No. 17/111,712, filed on Dec. 4, 2020, the entire contents of which are incorporated herein by reference.

FIELD

The present disclosure relates to capturing images of products and, in particular, to generating recommendations during image capture of a product.

BACKGROUND

In some online catalog platforms, a user may be tasked with taking photos of one or more products. The products and/or photos may be related to one another and, as such, consistency amongst the photos is crucial. For example, photos may be taken of different products being sold at the same store or in the same collection. As another example, photos may be taken of different variants (colour, size, etc.) of the same product. A customer may view multiple related photos at the same time or may view the related photos in quick succession. Any visual differences in the related photos may result in a poor experience for the customer and may lead to reduced brand appeal and/or sales.

BRIEF DESCRIPTION OF THE DRAWINGS

Embodiments will be described, by way of example only, with reference to the accompanying figures wherein:

FIG. 2 is an example of a home page of an administrator according to an embodiment;

FIG. 5 is a diagram illustrating an example product image feature model in the form of a look-up table according to an embodiment;

DETAILED DESCRIPTION

Figure 1:
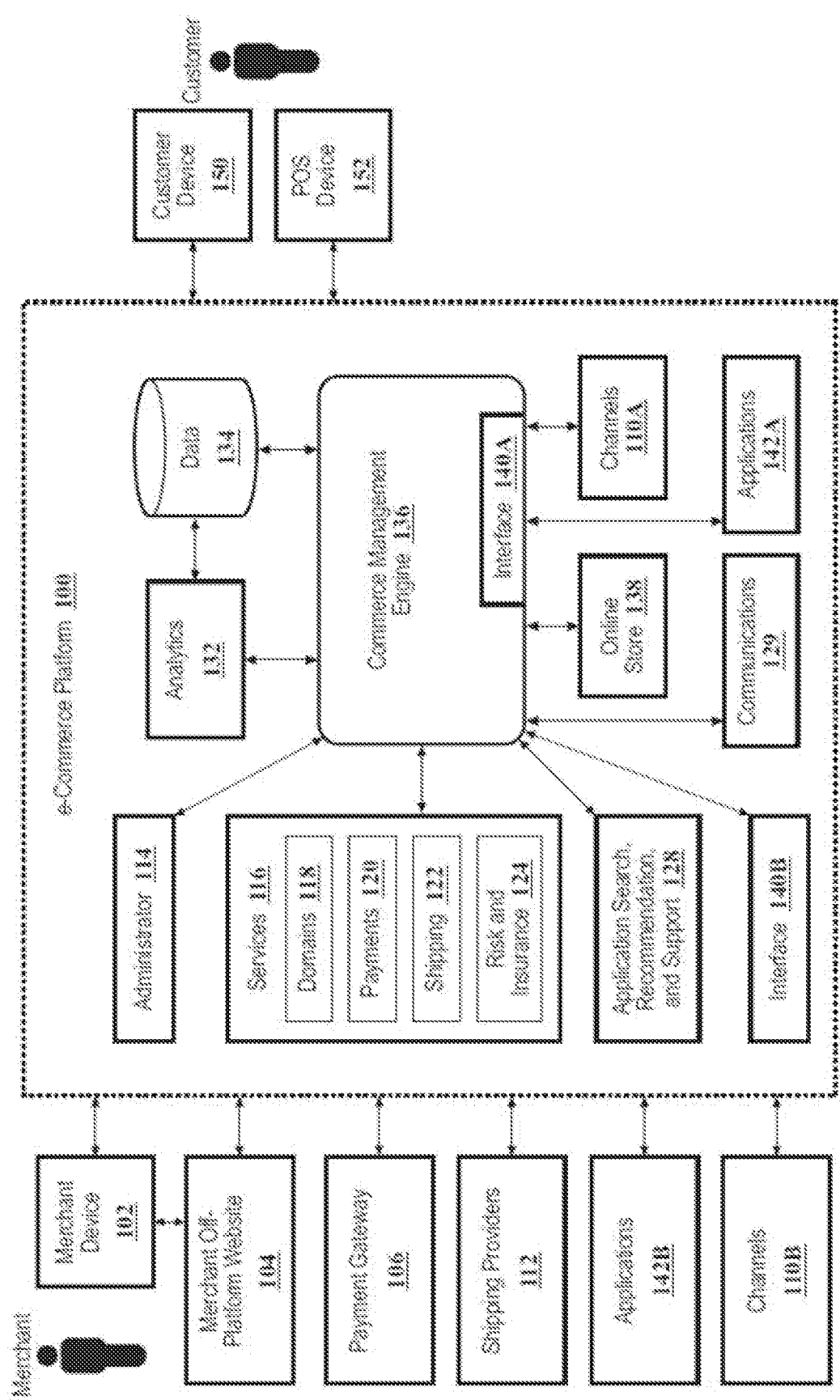
FIG. 1 is a block diagram of an example e-commerce platform according to an embodiment.

In some online catalog platforms, a user may be tasked with taking photos of one or more products. The products and/or photos may be related to one another and, as such, consistency amongst the photos is crucial. For example, photos may be taken of different products being sold at the same store or in the same collection. As another example, photos may be taken of different variants (colour, size, etc.) of the same product. A customer may view multiple related photos at the same time or may view the related photos in quick succession. Any visual differences in the related photos may result in a poor experience for the customer and may lead to reduced brand appeal and/or sales.

Visual differences may result from a difference in aspect ratio, product view angle, camera angle, depth between foreground and background, lighting, background objects, background clutter, background composition, positioning of the product in the frame, etc.

A user may take photos of related products and may attempt to correct any inconsistencies amongst these photos using post-processing actions. At this point, the user may realize that inconsistent photos may not be editable to achieve the desired consistency and thus will need to restart the entire process. This can be difficult and frustrating for an ordinary user and may lead to multiple wasted attempts.

In accordance with one aspect, the present application provides system and methods for generating recommendations during image capture of a product. The systems and methods may obtain a camera live stream from a camera in a user device, the camera live stream including image data of a particular product. One or more baseline image features common to images of one or more products of a collection may be determined based at least on image analysis of image data of the images of the one or more products of the collection. The one or more baseline image features may be compared to one or more image features of the image data of the particular product and one or more recommendations may be generated. The one or more recommendations may be displayed together with the camera live stream on the user device. In this manner, recommendations may instruct the user to make adjustments to ensure the one or more image features are consistent with image features of one or more images in the same collection.

In one aspect there may be provided a computer-implemented method. The computer-implemented method may comprise obtaining a camera live stream from a camera in a user device, the camera live stream including image data of a particular product; determining one or more baseline image features common to images of one or more products of a collection based at least on image analysis of image data of the images of the one or more products of the collection; comparing the one or more baseline image features to one or more image features of the image data of the particular product to generate one or more recommendations; and generating, for display together with the camera live stream on the user device, the one or more recommendations.

In one or more embodiments, the one or more recommendations may be recommendations to adjust the one or more image features of the image data of the particular product.

In one or more embodiments, the method may further comprise repeating the comparing and generating until the one or more image features of the image data of the particular product are within a threshold value of the one or more baseline image features.

In one or more embodiments, the method may further comprise responsive to the one or more image features of the image data of the particular product being within the threshold value of the one or more baseline image features, causing the user device to capture one or more images of the particular product.

In one or more embodiments, the method may further comprise analyzing the image data of the particular product to identify the particular product; and obtaining images of the one or more products of the collection based on the identified particular product.

In one or more embodiments, the method may further comprise prior to obtaining the camera live stream, obtaining information regarding the particular product; and obtaining images of the one or more products of the collection based on the information regarding the particular product.

In one or more embodiments, the images of the one or more products of the collection may be images previously captured by the user.

In one or more embodiments, the recommendations may be generated for capturing a further image of the particular product more consistent with the baseline image features.

In one or more embodiments, the image features may include at least one of image resolution, pixel density, image brightness, depth of field, focus, size of product in the image, angle of product in the image, orientation of product in the image, or contrast between the product and the background.

In one or more embodiments, the one or more recommendations may include at least one of a shape, text, image of a related product, or an animation.

According to another aspect there may be provided a system. The system may comprise one or more processors; processor-readable storage medium containing processor-executable instructions that, when executed by the one or more processors, may cause the one or more processors to obtain a camera live stream from a camera in a user device, the camera live stream including image data of a particular product; determine one or more baseline image features common to images of one or more products of a collection based at least on image analysis of image data of the images of the one or more products of the collection; compare the one or more baseline image features to one or more image features of the image data of the particular product to generate one or more recommendations; and generate, for display together with the camera live stream on the user device, the one or more recommendations.

In one or more embodiments, the one or more recommendations may be recommendations to adjust the one or more image features of the image data of the particular product.

In one or more embodiments, the processor-executable instructions, when executed by the one or more processors, may further cause the one or more processors to repeat the comparing and generating until the one or more image features of the image data of the particular product are within a threshold value of the one or more baseline image features.

In one or more embodiments, the processor-executable instructions, when executed by the one or more processors, may further cause the one or more processors to, responsive to the one or more image features of the image data of the particular product being within the threshold value of the one or more baseline image features, cause the user device to capture one or more images of the particular product.

In one or more embodiments, the processor-executable instructions, when executed by the one or more processors, may further cause the one or more processors to analyze the image data of the particular product to identify the particular product; and obtain images of the one or more products of the collection based on the identified particular product.

In one or more embodiments, the processor-executable instructions, when executed by the one or more processors, may further cause the one or more processors to, prior to obtaining the camera live stream, obtain information regarding the particular product; and obtain images of the one or more products of the collection based on the information regarding the particular product.

In one or more embodiments, the images of the one or more products of the collection may be images previously captured by the user.

In one or more embodiments, the recommendations may be generated for capturing a further image of the particular product more consistent with the baseline image features.

In one or more embodiments, the system may comprise the user device, the user device comprising the one or more processors; a display coupled to the one or more processors; and the camera, the camera including an image sensor and providing the live camera stream to the one or more processors.

According to another aspect there may be provided a non-transitory computer-readable medium storing processor-executable instructions that, when executed by one or more processors, may cause the one or more processors to obtain a camera live stream from a camera in a user device, the camera live stream including image data of a particular product; determine one or more baseline image features common to images of one or more products of a collection based at least on image analysis of image data of the images of the one or more products of the collection; compare the one or more baseline image features to one or more image features of the image data of the particular product to generate one or more recommendations; and generate, for display together with the camera live stream on the user device, the one or more recommendations.

For illustrative purposes, specific example embodiments will now be explained in greater detail below in conjunction with the figures.

Example E-Commerce Platform

In some embodiments, though not required, the methods disclosed herein may be performed on or in association with an e-commerce platform. Therefore, an example of an e-commerce platform will be described by way of background.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers (or "purchasers") as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
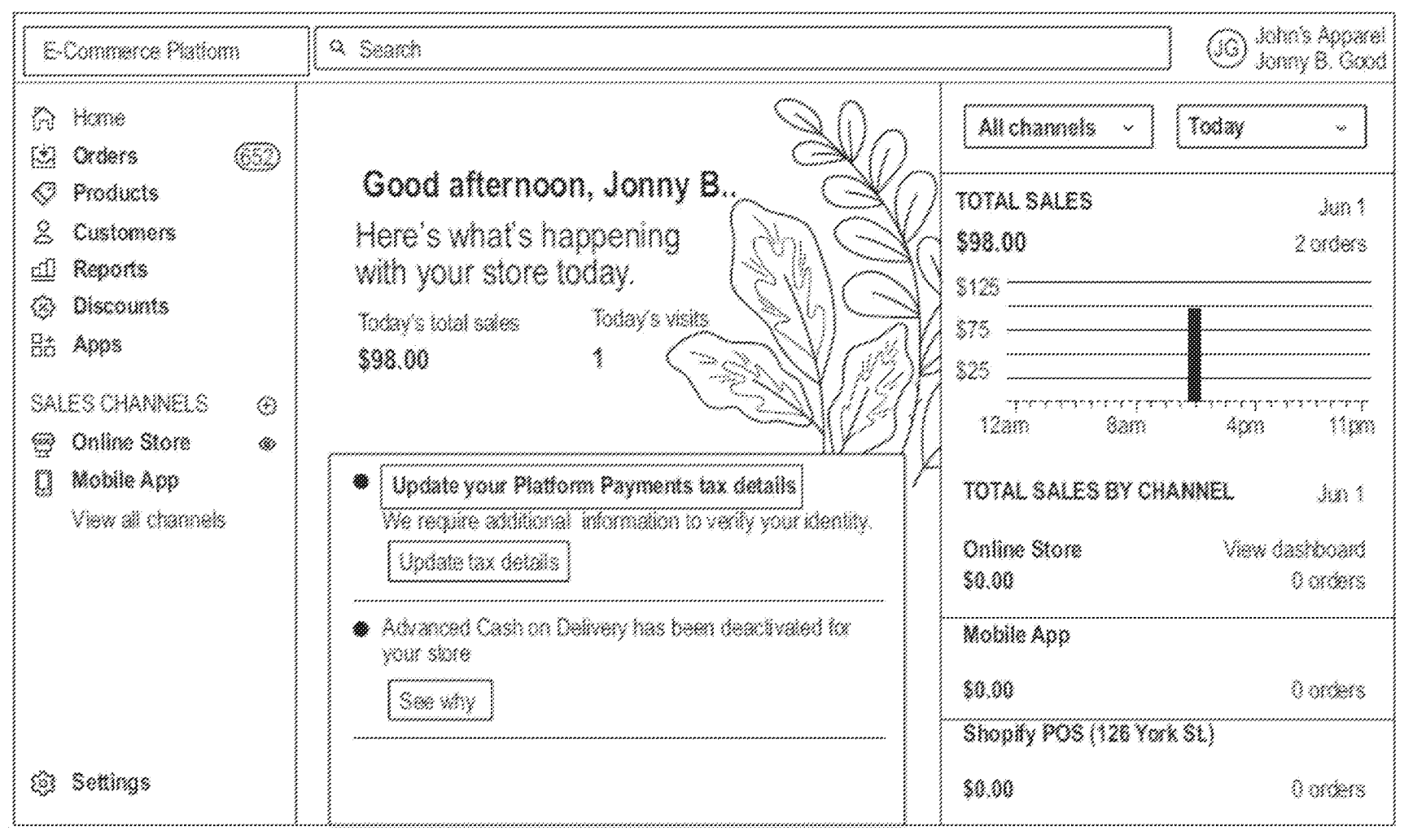

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for the communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a platform payment facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The platform payment facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharing) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for the platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through an application search, recommendations, and support platform 128 or system. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide the application search, recommendation and support platform 128. The application search, recommendation and support platform 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the lifespan of a cart may be in the order of minutes, carts may be persisted to an ephemeral data store in some cases. However, in many implementations, while the customer session may only last minutes, the merchant and/or customer may wish to have the possibility of returning to a cart built in a previous session. Accordingly, the cart, e.g. the shopping cart data structure populated with product item data and a user identifier, may be stored in persistent memory on the platform 100.

In a typical session, a customer proceeds to checkout at some point after adding one or more items to their shopping cart. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer does not complete the transaction, the e-commerce platform 100 may retain the shopping cart data structure in memory so that the customer may return to the partially-completed cart in a subsequent session (e.g., in an abandoned cart feature).

Checkouts may calculate taxes and shipping costs based on the customer's shipping address. Checkout may delegate the calculation of taxes to a tax component and the calculation of shipping costs to a delivery component. A pricing component may enable merchants to create discount codes. Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Figure 3:
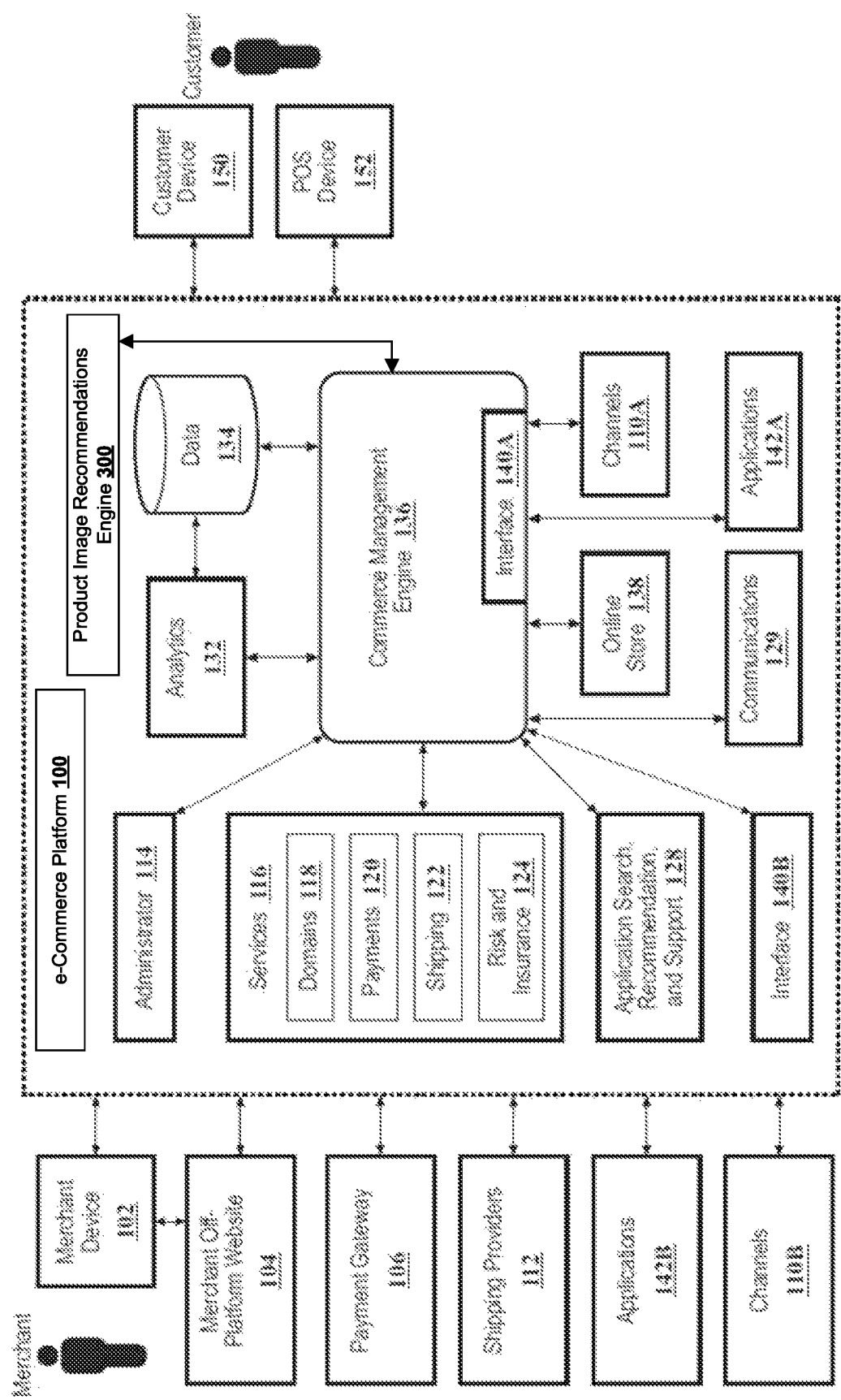
FIG. 3 is a block diagram of another example e-commerce platform according to an embodiment.

Implementation of Generating Recommendations During Image Capture Using an E-Commerce Platform The e-commerce platform 100 could help or assist a merchant that is in the process of generating images of their products. FIG. 3 illustrates the e-commerce platform 100 of FIG. 1, but including a product image recommendations engine 300. The product image recommendations engine 300 is an example of a computer-implemented system that obtains and analyses product images generated by a user, and actively provides the user with recommendations to improve product image consistency. In an example, the user is a merchant that is photographing their product for presentation in the online store 138. During the process of photographing their product, the product image recommendations engine determines one or more baseline image features common to previously-obtained images of one or more products of a particular collection within the online store 138. The merchant device 102 sends a live camera stream that includes image data of the product being photographed. The product image recommendations engine 300 compares the determined one or more baseline image features to one or more image features of the image data of the product being photographed and provides the merchant with one or more recommendations to adjust one or more image features to improve product image consistency.

Although the product image recommendations engine 300 is illustrated as a distinct component of the e-commerce platform 100 in FIG. 3, this is only an example. A product image recommendations engine could also or instead be provided by another component of the e-commerce platform 100. In some embodiments, either or both of the applications 142A-B provide a product image recommendations engine that is available to merchants. Furthermore, in some embodiments, the commerce management engine 136 provides a product image recommendations engine. The e-commerce platform 100 could include multiple product image recommendations engines that are provided by one or more parties. The multiple product image recommendation engines could be implemented in the same way, in similar ways, and/or in distinct ways. In addition, at least a portion of a product image recommendations engine could be implemented on the merchant device 102. For example, the merchant device 102 could store and run the product image recommendations engine locally as a software application.

As discussed in further detail below, the product image recommendations engine 300 could implement at least some of the functionality described herein. Although the embodiments described below may be implemented in association with the e-commerce platform 100, the embodiments described below are not limited to the specific e-commerce platform 100 of FIGS. 1 to 3. Therefore, the embodiments below will be presented more generally in relation to any e-commerce platform. More broadly, though the following is described in relation to the example of an e-commerce platform, the subject matter of the present application may be more broadly applied. For example, it may be applicable in other scenarios where it is desirable to produce a set of consistent photographs of related images such as, for example, when preparing a set of image plates for use in a guide or textbook (e.g., showing different items of a particular type or class), yearbook, catalogue, magazine, etc.

Product Images

As used herein, the term "product image" refers to any image that illustrates or depicts a product. In particular embodiments, a product image is used to present or display a product that is offered for sale in an online store. Product images could also or instead be used in other forms of media, such as in advertisements or articles, for example.

The manner by which a product image is generated is not limited herein. A product image may be generated, at least in part, by capturing an image of a physical product or object using a camera or scanner, for example. Product images that are generated, at least in part, using computer-generated imagery (CGI) are also contemplated. A product image could be two-dimensional (2D) or three-dimensional (3D).

In some embodiments, a product image is animated. For example, a product image could include a video of a product. A 3D scan of a product could be converted to an animated product image that illustrates the product from various angles.

As noted above, customers often judge the quality of a product based on how it is presented in a product image. This may be particularly relevant for online shopping, as a customer typically does not have the option of inspecting the physical product, and therefore the customer may judge the product based on its associated product image. In some cases, the customer can be influenced by the quality of the product image.

As used herein, the "quality" of a product image relates to the perceived value of a product that is conveyed by a product image. The factors affecting the quality of a product image are not limited to the properties of the device that was used to generate the product image. By way of example, the properties of a camera that is used to photograph a product and the conditions that the product is photographed under can both affect the quality of a resulting product image. A high-quality product image is one that portrays the product in a way that is appealing to customers, and is typically associated with higher market success. In contrast, a low-quality product image is an image that portrays the product in a way that is unclear, ambiguous or otherwise unappealing to customers. Low-quality product images may lead to lower market success, especially when these low-quality product images are displayed to a customer alongside high-quality product images for similar products in an online store, for example. Accordingly, many merchants desire high-quality product images for their products.

Market success relates to how well something is received in a commercial market. In some cases, the market success of a product image is measured, at least in part, in terms of the market success of the product that is displayed in the product image. However, in general, the market success of a product image could be measured or quantified in any of a variety of ways. The following is a non-limiting list of measurable metrics or parameters that are indicative of the market success of a product image:

- sales data, such as quantity and/or dollar amount of sales of the product;
- quantity of sales of the product relative to the total number of sales for similar products;
- pages views, including the number of customers that viewed the product or product image (for example, the click-through rate of a website link associated with a product image);
- customers that enlarged the product image;
- average time customers spent viewing the product image;
- whether or not the product image was taken by a professional product photographer;
- social media re-sharing of a product image or of a product associated with a product image;
- consistency or similarity with other product images sold by the same merchant (for example, a product image having consistent or similar parameter values with other product images sold by the same merchant, further details of which are provided below); and
- consistency or similarity with other product images within a collection sold by the same merchant (for example, a product image having consistent or similar parameter values with other product images within a collection sold by the same merchant, further details of which are provided below.

Any one or any combination of these parameters determined to meet or exceed a desired target value or values may be indicative of high-market success. On the other hand, any one or any combination of these parameters determined to fall below a desired target value or values may be indicative of low-market success. In other words, improving the market success of a product image (as indicated or measured via any one of the parameters above) could lead, directly or indirectly, to increased sales of a product. Therefore, some embodiments provided herein relate to the generation of recommendations during image capture to improve consistency with other product images within a collection.

Implementation of Generating Recommendations During Image Capture

Figure 4:
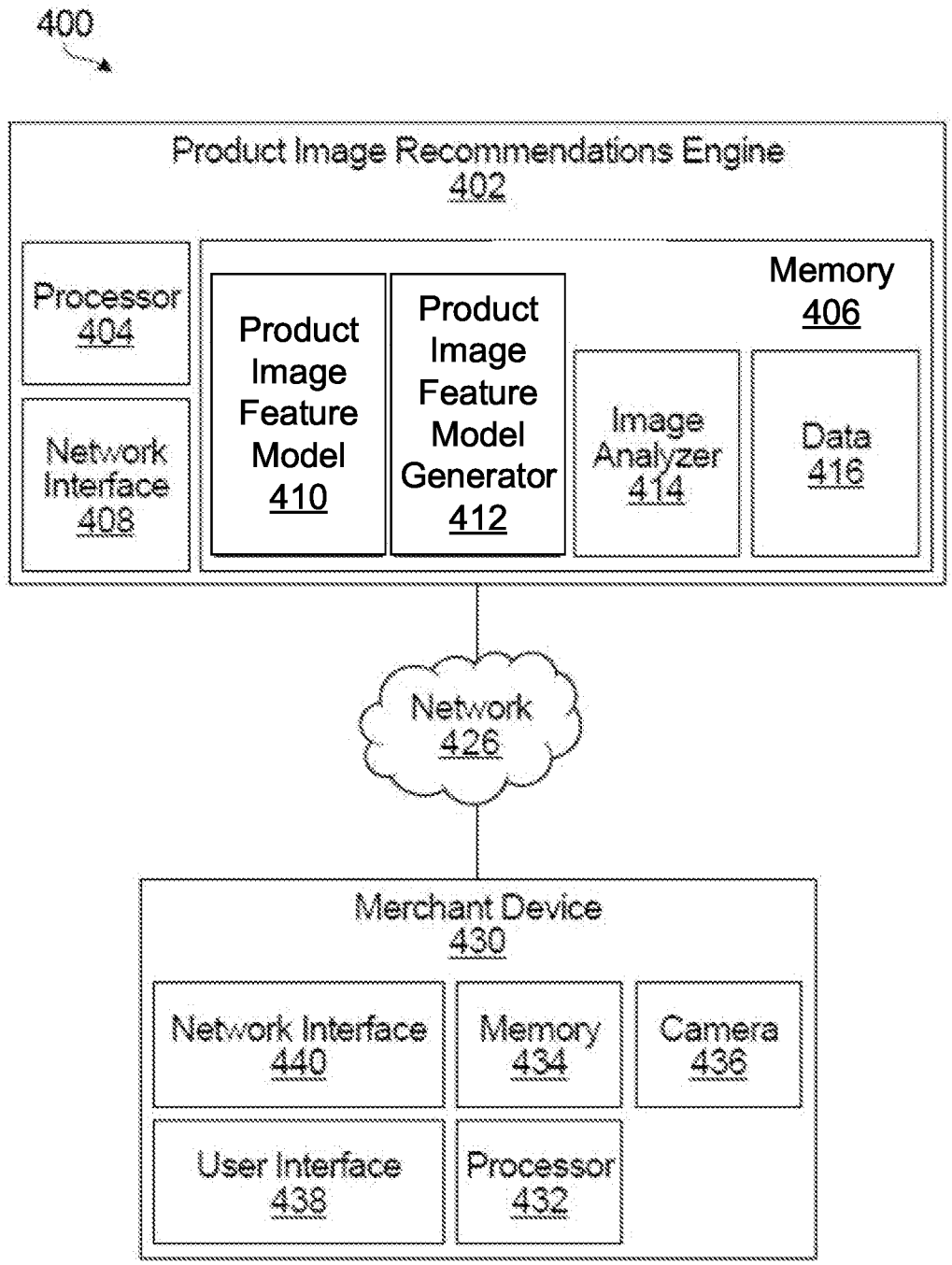
FIG. 4 is a block diagram illustrating an example system for generating recommendations during image capture of a product according to an embodiment.

FIG. 4 is a block diagram illustrating an example system 400 for generating recommendations during image capture. The system 400 includes a product image recommendations engine 402, a network 426, and a merchant device 430.

The product image recommendations engine 402 includes a processor 404, memory 406, and a network interface 408. The processor 404 may be implemented by one or more processors that execute instructions stored in the memory 406. Alternatively, some or all of the processor 404 may be implemented using dedicated circuitry, such as an application specific integrated circuit (ASIC), a graphics processing unit (GPU), or a programmed field programmable gate array (FPGA).

In this embodiment, the memory 406 stores a product image feature model 410 which may be used to improve product image consistency for images within a particular collection. Put another way, the product image feature model 410 may store average image features for one or more product images within a particular collection. Non-limiting examples of such image features include:

- image resolution;
- pixel density of the image;
- image brightness;
- depth of field;
- focus;
- size of the product in the image (in terms of percentage of area occupied by the product and/or number of pixels occupied by the product, for example);
- angle or orientation of the product in the image; and
- contrast between the product and the background.

The product image feature model 410 is specific to, or dependent on, a particular merchant and/or a particular collection of products. For example, if a merchant operates an online store that sells multiple different coffee mugs, a product image feature model that is specific to that merchant and to coffee mugs may be generated.

The product image feature model 410 may be implemented in any of a variety of ways. Example implementations of product image feature models include a look-up table. However, other implementations of product image models are also contemplated.

In the look-up table implementation, a table could store a list of different product image features, a value, and a threshold for each product image feature. These values may be determined based on one or more previously-captured product images of one or more products within a collection. For example, the values may be determined based on average values of the image features for one or more previously-captured product images within the collection.

The product image features stored in the look-up table could be referred to as baseline image features. Different look-up tables can be used for different collections of products and/or different product types for different merchants. For example, each collection within an online store for a particular merchant may have an associated look-up table.

FIG. 5 is a diagram illustrating an example product image feature model in the form of a look-up table 500. The look-up table 500 is specific to product images within a collection of coffee mugs for a particular merchant. The look-up table defines a value and a threshold for multiple baseline image features of a product image. The value is an average value for previously-obtained product images in the collection. The threshold defines how close an image feature must be to the baseline image feature to be considered consistent. The image features defined in the look-up table 500, which are discussed in further detail below, include image resolution, image brightness, depth of field, focal point, size of the mug, tilt of the mug, azimuthal angle of the mug, and contrast.

Image resolution relates to the number of pixels in an image. In the look-up table 500, image resolution is measured in megapixels. The average value for image resolution is 15 megapixels indicating that the average value of image resolution for previously-obtained product images in the collection is 15 megapixels. The threshold is set as 0.5 megapixels and this indicates that any image resolution between 14.5 megapixels and 15.5 megapixels is considered close enough to the average value to be considered consistent.

Average image brightness relates to the overall lightness or darkness of an image. In the look-up table 500, average image brightness is defined as a percentage of maximum image brightness. In an embodiment, average image brightness may be determined, for example, using a transform algorithm to convert pixels of the image to hue, saturation, value (HSV) and determining the average of the value V. Maximum image brightness (100%) is when each pixel is set to its brightness value, producing a completely white image. An image brightness of 0% is a completely black image. Image brightness could be defined differently in other embodiments. The average value for image brightness is 55% indicating that the average value of image brightness for previously-obtained product images in the collection is 55%. The threshold is set as 1% and this indicates that any image brightness between 54% and 56% is considered close enough to the average value to be considered consistent.

In the look-up table 500, depth of field relates to how much of the coffee mug is in focus in a product image. The average value for depth of field is 21 cm indicating that the average value of depth of field for previously-obtained product images in the collection is 21 cm. The threshold is set as 1 cm and this indicates that any depth of field between 19 cm and 22 cm is considered close enough to the average value to be considered consistent.

In the look-up table 500, the focal point is measured relative to the front surface of the coffee mug. The front surface of the coffee mug might be where any illustrations are shown, and the focus is ideally at this surface of the coffee mug to show these illustrations more clearly. The average value for focal point is 0.5 cm indicating that the average value of focal point for previously-obtained product images in the collection is 0.5 cm. The threshold is set as 0.05 cm and this indicates that any focal point between 0.45 cm and 0.55 cm is considered close enough to the average value to be considered consistent.

In the look-up table 500, the size of the mug relates to the size of the coffee mug in the product image. This is measured in terms of the percentage of pixels in the product image that are occupied by the coffee mug. An image that fills the entirety of a product image would be considered to occupy 100% of the pixels in the product image. The average value for size of the mug is 70% indicating that the average value of the size of the mug for previously-obtained product images in the collection is 70%. The threshold is set as 2% and this indicates that any size of mug between 68% and 72% is considered close enough to the average value to be considered consistent.

In the look-up table 500, the tilt of the mug defines the angle of the coffee mug in the product image with respect to horizontal. In an embodiment, the tilt of the mug may be determined by, for example, determining the orientation of the sensor of the user device. A tilt of 0° represents a coffee mug that appears to rest on a flat surface in the product image. A tilt value that differs from 0° could result from a coffee mug being on a sloped surface, or from a camera being tilted relative to horizontal. The average tilt of the mug is 0.2° indicating that the average tilt of the mug for previously-obtained product images in the collection is 0.2°. The threshold is set as 0.01° and this indicates that any tilt of mug between 0.19° and 0.21° is considered close enough to the average value to be considered consistent.

The azimuthal angle of the mug defines the portion or side of the coffee mug that is in view in the product image. In the look-up table 500, the azimuthal angle is defined relative to the handle of the coffee mug. A product image for a coffee mug with an azimuthal angle of 0° would have the handle pointed towards the camera. A product image for a coffee mug with an azimuthal angle of 90° would have the handle of the coffee mug being viewed from the side in the product image, allowing the customer to appreciate the shape of the handle. The average azimuthal angle of the mug is 91° indicating that the average azimuthal angle of the mug for previously-obtained product images in the collection is 91°. The threshold is set as 1° and this indicates that any azimuthal angle of mug between 90° and 92° is considered close enough to the average value to be considered consistent.

Contrast relates to how well the coffee mug stands out from the background of the product image. In the look-up table 500, the contrast is defined as the ratio of the average brightness of the coffee mug to the average brightness of the background. This contrast could be greater than one or less than one. For example, a dark coffee mug and a light background would produce a contrast that is less than one, whereas a light coffee mug and a dark background would produce a contrast that is greater than one. In the look-up table 500 it is assumed that the coffee mug is a light coffee mug and a dark background. As such, the average contrast of the mug is 2:1 indicating that the average contrast of the mug for previously-obtained product images in the collection is 3:1. The threshold is set as 0.5 indicating that any contrast between 2.95:1 and 3.05:1 is considered close enough to the average value to be considered consistent.

Although each baseline image feature included in the look-up table 500 is shown as an average baseline image feature based on one or more previously-obtained product images in the collection, it will be appreciated that alternatives are available. For example, a single previously-obtained product image may be used to determine the baseline image features. In this example, each baseline image feature may be determined by analyzing the single previously-obtained product image. Put another way, each baseline image feature would not be an average baseline feature but rather would be set as being equivalent to the baseline image feature in the single previously-obtained product image. In another example, default baseline image features may be used. For example, a square aspect ratio may be set as default. In this example, the default baseline image features may be adjusted or overridden by the user and the adjusted or overridden values may be set as new default baseline image features for the user.

It should be noted that the specific baseline image features, values and thresholds shown in the look-up table 500 are provided by way of example only. This example is in no way limiting. Other look-up tables, whether for coffee mugs or another type of product, could include a different number of baseline image features, different types of baseline image features, different metrics for characterising baseline image features, different average values and different thresholds. Other formats of look-up tables, different from that shown in FIG. 5, are also contemplated.

The look-up table 500 may be used by the product image recommendations engine 402 to generate recommendations during image capture of a product to improve image consistency for images within a particular collection. For example, during image capture, if any image features are not within the threshold of baseline image features defined in the look-up table 500, then that image feature may be considered to be inconsistent with other product images within the particular collection.

Referring again to FIG. 4, the memory 406 also stores a product image feature model generator 412, which facilitates the generation of the product image feature model 410. Once the product image feature model 410 is generated, it may be updated when new data becomes available. For example, when one or more new product images are taken by the user and added to a collection, the product image feature model 410 may be updated to include the new product images when determining average values for the baseline image features. This updating can also be facilitated by the product image feature model generator 412.

In some implementations, the product image feature model generator 412 provides a software application that is executable by the processor 404 and allows a user to select or de-select one or more previously-obtained product images within a collection to be used or to be ignored when generating the product image feature model 410.

In some implementations, the product image feature model generator 412 provides a software application that is executable by the processor 404 and allows a user to manually update at least a portion of the product image feature model 410. For example, the product image feature model generator 412 could generate a look-up table and allow a user to manually adjust the thresholds in the look-up table.

The memory 406 stores data 416 that is used by the product image feature model generator 412 for generating the look-up table. The data 416 may be acquired from previously-obtained product images in an e-commerce platform. These previously-obtained product images may include product images that are and/or have been used to display a product for sale on an online store. In some implementations, the data 416 could be provided by a data facility of an e-commerce platform, such as for example the data facility 134 of FIG. 1. The data 416 could form part of a larger data set that stores other information related to e-commerce. Alternatively, the data 416 could be a data set that is specific to product image recommendations. The product image recommendations engine 402 could continuously or periodically acquire and store new information in the data 416. Older information could also be removed from the data 416 as new information becomes available.

For a particular previously-obtained product image, the data 416 could store any or all of the following information:
product type;
product collection;
merchant that the product image belongs to; or
image features of the product image.

The memory 406 further includes an image analyzer 414. The image analyzer 414 may be configured to receive a product image and may determine image features of the product image. In some cases, the image analyzer 414 is used to determine the image features of one or more previously-obtained product images for storage in the data 416. The image analyzer 414 could also or instead be used to determine the product image features for a product image that is received as part of a camera live stream from a merchant.

In some implementations, the image analyzer 414 is or includes an image analysis algorithm that is executed by the processor 404. An image analysis algorithm may include an image segmentation process to locate the boundary between the product and the background in a product image. This may help when determining certain image features such as the percentage of a product image that is occupied by a product, for example.

An example of an image analysis algorithm is the scale-invariant feature transform (SIFT). The SIFT algorithm extracts points of interest, termed keypoints in the SIFT framework, from a target image. The extracted keypoints carry their own information of location, scale and rotation, which helps detect and describe features of the image. The detected features can then be used to determine image features of the product image. Further detail regarding the SIFT algorithm, and several other example image analysis algorithms, can be found in Computer Vision: Algorithms and Applications by Richard Szeliski (Springer, 2010), the contents of which are herein incorporated by reference in their entirety.

The network interface 408 in the product image recommendations engine 402 is provided for communication over the network 426. The structure of the network interface 408 is implementation specific. For example, in some implementations the network interface 408 may include a network interface card (NIC), a computer port (e.g., a physical outlet to which a plug or cable connects), and/or a network socket.

The merchant device 430 is an example of a user device. The merchant device 430 may be a mobile phone, tablet, laptop, or computer owned and/or used by a merchant. The merchant device 430 includes a processor 432, memory 434, camera 436, user interface 438 and network interface 440. An example of a user interface is a display screen (which may be a touch screen), a keyboard, and/or a mouse. The network interface 440 is provided for communicating over the network 426. The structure of the network interface 440 will depend on how the merchant device 430 interfaces with the network 426. For example, if the merchant device 430 is a mobile phone or tablet, the network interface 440 may include a transmitter/receiver with an antenna to send and receive wireless transmissions to/from the network 426. If the merchant device is a personal computer connected to the network with a network cable, the network interface 440 may include, for example, a NIC, a computer port, and/or a network socket. The processor 432 directly performs or instructs all of the operations performed by the merchant device 430. Examples of these operations include processing user inputs received from the user interface 438, preparing information for transmission over the network 426, processing data received over the network 426, and instructing a display screen to display information. The processor 432 may be implemented by one or more processors that execute instructions stored in the memory 434. Alternatively, some or all of the processor 432 may be implemented using dedicated circuitry, such as an ASIC, a GPU, or a programmed FPGA. The camera 436 is provided to take photographs, which can be stored in the memory 434. The camera 436 is one example of a device for generating an image of an object. A merchant device could also or instead include other devices such as scanners, for example. Although the camera 436 is shown as a component of the merchant device 430, the camera could instead be implemented separate from the merchant device and communicate with the merchant device via wired or wireless connections, for example.

In FIG. 4, one merchant device is shown by way of example. In general, more than one merchant device may be in communication with the product image recommendations engine 402.

The product image recommendations engine 402 could be implemented in any of a variety of ways. For example, the product image recommendations engine 402 could be implemented by an e-commerce platform, either as a core function provided by the e-commerce platform, or by an application supported by the e-commerce platform. The product image recommendations engine 402 could also or instead be implemented outside of an e-commerce platform. In some embodiments, a product image recommendations engine is implemented in part or in whole on a user device, such as the merchant device 430. For example, a software application may be installed on a user device that performs image analysis and generates recommendations locally (i.e., on the user device). The software application could download the product image feature model 410 and/or the image analyzer 414 from a server, which may or may not be part of a product image recommendations engine or e-commerce platform.

Figure 6:
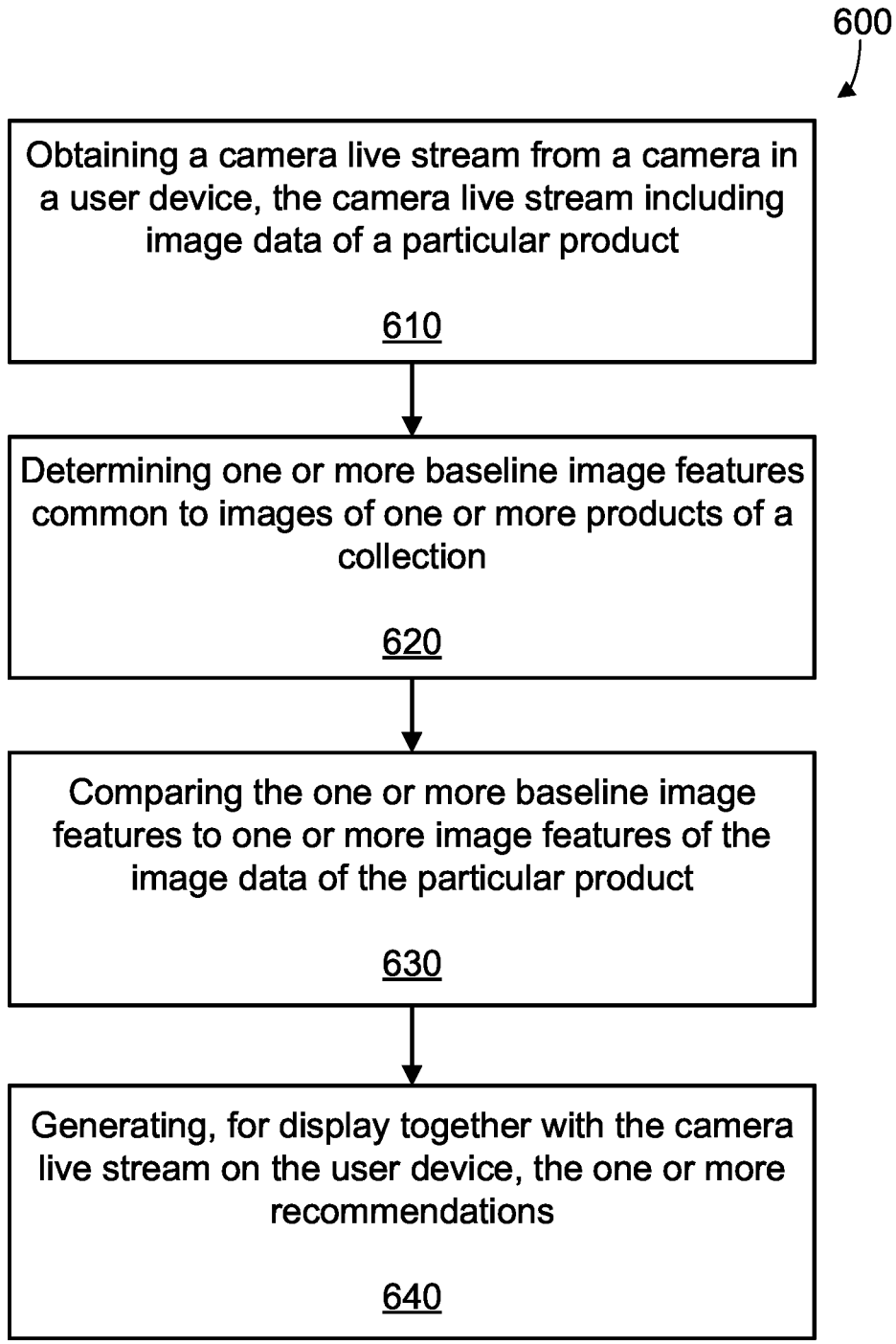
FIG. 6 is a flowchart illustrating an example method for generating recommendations during image capture of a product according to an embodiment.

The system 400 could provide a user with recommendations while the user is in the process of capturing a product image. An example method 600 for generating recommendations during image capture of a product is described below with reference to FIG. 6. The method 600 may be implemented by a computing device having suitable computer-executable instructions for causing the computing device to carry out the described operations. The instructions may be implemented by way of an application executing on a computing device. The method 600 may be implemented, in whole or in part, by a user device such as the merchant device 430 (FIG. 4). The merchant device 430 (FIG. 4) may utilize the product image recommendations engine 402. In some implementations, the user device may off-load at least some operations of the method 600 to an external device such as for example to a server that may be part of the product image recommendations engine 402 (FIG. 4) or an e-commerce platform.

The method 600 includes obtaining a camera live stream from a camera in a user device, the camera live stream including image data of a particular product (step 610).

In this embodiment, a camera function is initiated to obtain real-time live stream images from the camera of the user device. The real-time live stream provides a stream of images from the camera, which may be referred to as a live mode, preview mode, or viewfinder mode. The live stream of images may be pre-processed using, for example, an image processor. In some cases, the processing includes feature detection for identifying and/or tracking a particular product.

The processing of the live stream produces a processed live stream. The processing may include, for example, cropping the images to obtain a cropped live stream and/or scaling the images to obtain a scaled live stream. The processed live stream may be displayed as the live stream.

The processing may include, for example, altering a portion of the image adjacent to the detected particular product, e.g. a background portion of the image. The altering of the background may include blurring the background or filling the background with a uniform colour value.

The processing may include, for example, altering image parameters within the images of the live stream. Image parameters may include, for instance, brightness, hue, saturation, white balance, or other such parameters.

The detection of the particular product may employ feature detection, and may, in some cases, be guided by a set of defined shapes or features that are associated with expected physical items. Examples may include boxes, cans, bottles, cartons, bags, or other such retail packaging. In the example case of a clothing retailer, the example physical items may be clothing shapes. The feature detection may include any suitable technique for identifying edges, blobs, corners, and may obtain feature descriptors or feature vectors relating to identified patches of interest in the image. The feature descriptors may be analyzed through attempting to match the feature descriptor with a library or database of features. The analysis may use scale-invariant feature transforms (SIFT) or other such image analysis techniques for mathematically describing local features and comparing them to entries in a database of features in order to try to recognize an object. Various computer vision techniques may be employed in implementing feature detection.

In some cases, the detection of the particular product may further include extraction of data. The data extraction may include further feature detection aimed at, for example, logos or graphics in the area of interest. In some cases, text recognition algorithms, like optical character recognition (OCR), may be employed to extract text from the portion of the image containing the particular product. In some cases, feature detection may be employed to identify an associated label, shelf tag, hang tag, or other identifying data regarding the particular product.

The method 600 includes determining one or more baseline image features common to images of one or more products of a collection (step 620).

In this embodiment, step 620 requires obtaining images of one or more products in a collection. The collection is a collection of products that the particular product will be a part of. An example collection may be "coffee mugs" and as such images of one or more coffee mugs previously-captured by the user are obtained. The particular product in this example is also a coffee mug.

Figure 7:
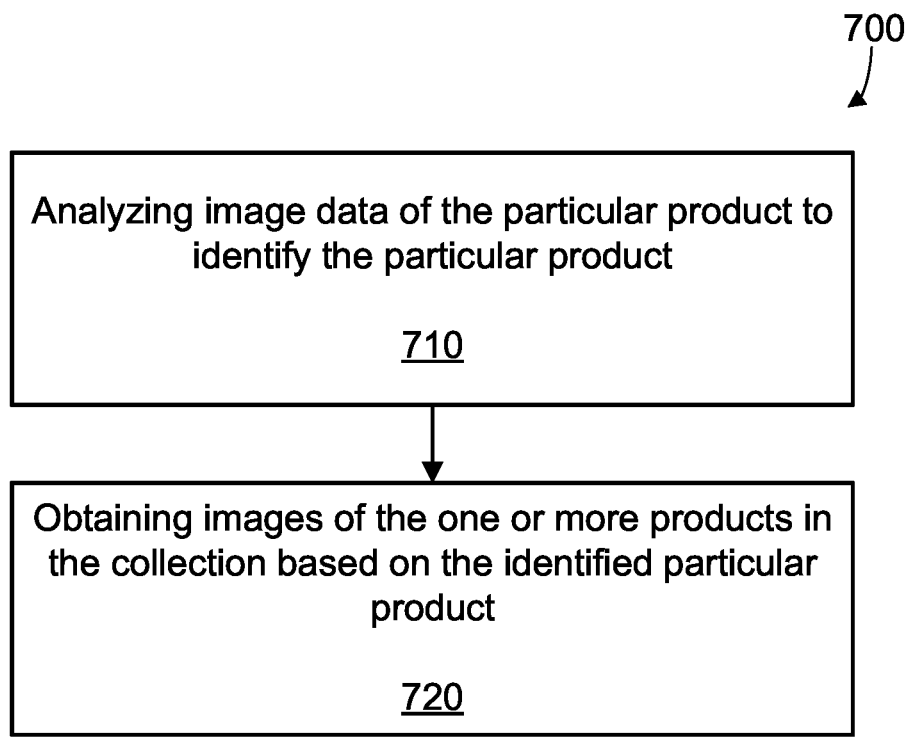
FIG. 7 is a flowchart illustrating an example method for obtaining images of one or more products in a collection according to an embodiment.

In an embodiment, the particular product may be identified and the images of the one or more products may be obtained based on the identified particular product according to a method 700 shown in FIG. 7. The method 700 may be implemented by a computing device having suitable computer-executable instructions for causing the computing device to carry out the described operations. The instructions may be implemented by way of an application executing on a computing device. The method 700 may be implemented, in whole or in part, by a user device such as the merchant device 430 (FIG. 4). The merchant device 430 (FIG. 4) may utilize the product image recommendations engine 402. In some implementations, the user device may off-load at least some operations of the method 700 to an external device such as for example to a server that may be part of the product image recommendations engine 402 (FIG. 4) or an e-commerce platform.

The method 700 includes analyzing image data of the particular product to identify the particular product (step 710). Step 710 may be performed, for example, using the image analyzer 414 (FIG. 4). In this embodiment, the image data included with the camera live stream may be analyzed to identify the particular product. For example, the identification of the particular product may employ feature detection, and may, in some cases, be guided by a set of defined shapes or features that are associated with expected physical items. The feature detection may include any suitable technique for identifying edges, blobs, corners, and may obtain feature descriptors or feature vectors relating to identified patches of interest in the image. The feature descriptors may be analyzed through attempting to match the feature descriptor with a library or database of features. The analysis may use scale-invariant feature transforms (SIFT) or other such image analysis techniques for mathematically describing local features and comparing them to entries in a database of features in order to try to recognize an object. Various computer vision techniques may be employed in implementing feature detection. The image data may be processed in real-time and the processed image may be shown as the live camera stream.

Once the particular product has been identified, images of one or more products in the collection may be obtained based on the identified particular product (step 720). For example, the particular product may be identified as being a coffee mug and as such images of one or more coffee mugs previously-captured by the user may be obtained. The images may be obtained from memory on the user device or may be obtained from an external device such as for example from a server that may be part of the product image recommendations engine 402 (FIG. 4) or an e-commerce platform.

Figure 8:
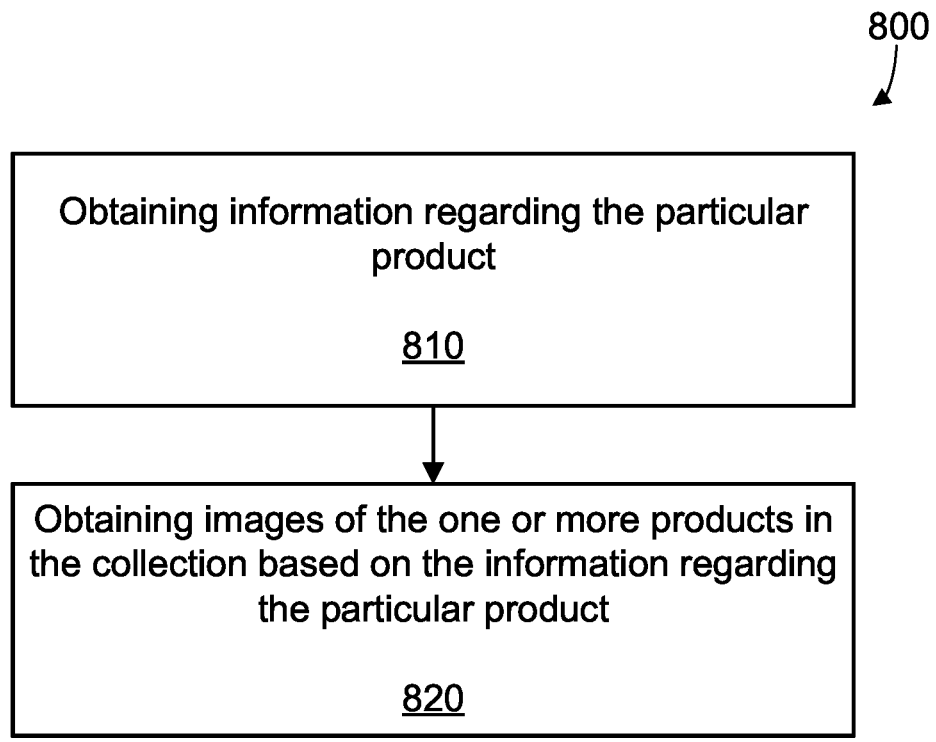
FIG. 8 is a flowchart illustrating another example method for obtaining images of one or more products in a collection according to an embodiment.

In another embodiment, information regarding the particular product may be obtained and the images of the one or more products may be obtained based on this information according to a method 800 shown in FIG. 8. The method 800 may be implemented by a computing device having suitable computer-executable instructions for causing the computing device to carry out the described operations. The instructions may be implemented by way of an application executing on a computing device. The method 800 may be implemented, in whole or in part, by a user device such as the merchant device 430 (FIG. 4). The merchant device 430 (FIG. 4) may utilize the product image recommendations engine 402. In some implementations, the user device may off-load at least some operations of the method 800 to an external device such as for example to a server that may be part of the product image recommendations engine 402 (FIG. 4) or an e-commerce platform.

The method 800 includes obtaining information regarding the particular product (step 810). In this embodiment, prior to initiating image capture, the user device may display a graphical user interface requesting information regarding the particular product. For example, the graphical user interface may include a selectable option such as a drop down menu that may be used to select the category that the particular product is to be added to. The categories listed in the drop down menu may include all categories of products available at the user's store. The user may select one of the categories and accordingly the information regarding the particular product is obtained.

Images of one or more products in the collection may be obtained based on the information regarding the particular product (step 820). For example, the information regarding the particular product may be based on the user selecting a "coffee mug" category and as such images of one or more coffee mugs previously-captured by the user and included in the selected category may be obtained. The images may be obtained from memory on the user device or may be obtained from an external device such as for example from a server that may be part of the product image recommendations engine 402 (FIG. 4) or an e-commerce platform.

In another embodiment, the information regarding the particular product may be automatically determined based on commerce workflow in which the particular product has come to be added to the store. For example, the merchant may have been viewing one of their product collections and may select a selectable option associated with an option to "add a new product to the collection."

In another embodiment, the user may select one or more images to be used for determining the one or more baseline features. For example, a graphical user interface may be displayed on the user device and may include one or more images previously-captured by the user. The user may select one or more of the displayed images using, for example, an input interface associated with the user device. For example, the user may select an image by performing a tap gesture on a display screen of the user device at a location corresponding to a displayed location of the image. The graphical user interface may include a selectable option that, when selected by the user, may indicate that the user has completed selecting the images of the one or more products.

In another embodiment, a particular category may include one or more outlier images that are not to be included when generating the recommendations. For example, one or more images in the category may be images obtained from a supplier and thus are not images previously-captured by the user. In this embodiment, when it is determined which category the particular product is to be added to, the user may select one or more images to be used for determining the one or more baseline features. For example, a graphical user interface may be displayed on the user device and may include one or more images previously-captured by the user within that category. Images that are not selected by the user are ignored or otherwise not used when generating the baseline image features.

In one or more embodiments, a category may not yet exist for the particular product. As such, the graphical user interface may include a selectable option to add a new category.

Once the images of the one or more products in the collection have been obtained, the one or more baseline features common to images of the one or more products of the collection are determined. Non-limiting examples of baseline image features include:
  image resolution;
  pixel density of the image;
  image brightness;
  depth of field;
  focus;
  size of the product in the image (in terms of percentage of area occupied by the product and/or number of pixels occupied by the product, for example);
  angle or orientation of the product in the image; and
  contrast between the product and the background.

In this embodiment, the product image feature model generator 412 may be used to generate a look-up table similar to look-up table 500 described herein. Specifically, an average of one or more baseline image features may be calculated by analyzing the images of the one or more products using, for example, the image analyzer 414. As mentioned, a single image may be used and as such one or more baseline image features may be determined by analyzing the single image and determining the one or more baseline features of the single image.

As mentioned, a category may not yet exist for the particular product and as such the graphical user interface may include a selectable option to add a new category. The user may be required to select previously-captured images of one or more products outside of the new category and these selected images may be used to determine the one or more baseline image features. For example, the particular product may belong to a new category "coffee mugs" and the user may select previously-captured images of "beer mugs" to be used to determine the one or more baseline image features.

The method 600 includes comparing the one or more baseline image features to one or more image features of the image data of the particular product (step 630).

In this embodiment, one or more image features of the image data of the particular product are determined and compared to a corresponding baseline image feature. As mentioned, the baseline image features may include the size of the mug. With reference to look-up table 500, the average value of the size of a coffee mug in the images of one or more products in the collection "coffee mugs" may be calculated as 70%. The threshold is 2% and this indicates that any size of mug between 68% and 72% is considered close enough to the average value to be considered consistent. The size of the particular product, or coffee mug, in the image data of the particular product may be determined to be 60%. As such, the size of the particular product in the image data is too small as it is outside of the threshold of the baseline image feature.

The method 600 includes generating, for display together with the camera live stream on the user device, the one or more recommendations (step 640). The one or more recommendations are based on the comparing of the one or more baseline image features to the one or more image features of the image data of the particular product. The recommendations are generated to improve product image consistency.

The recommendations may include recommendations to change the settings of the camera and/or recommendations to change the conditions in the environment in which the particular product is located. The image features may be dependent on the capabilities of the camera that is used to take the product image, the settings of the camera, and the conditions in the environment in which the particular product is located. The following is a non-limiting list of capabilities, settings and conditions that may be changed to adjust one or more image features:
- camera resolution;
- camera sensitivity;
- aperture size;
- exposure time;
- zoom settings;
- filtering;
- flash settings;
- distance from the camera to the product;
- orientation of the product relative to the camera;
- camera mode (for example, portrait mode);
- light source(s) used; and
- background(s) used.
  - size of the product in the image (in terms of percentage of area occupied by the product and/or number of pixels occupied by the product, for example);
  - angle or orientation of the product in the image;
  - contrast between the product and the background; and
  - removal of one or more background products.

The recommendations are generated to help a merchant generate an image with image features that are consistent with image features of one or more previously-captured images within a collection. In this manner, the merchant is not required to have experience or expensive equipment in an order to obtain or otherwise generate images that are consistent amongst products in a collection.

In some implementations, the recommendation includes an instruction for the merchant. For example, the instruction may be to change a light source, background, distance from the camera to the product and/or orientation of the product relative to the camera. In some implementations, the recommendation includes an instruction that may be automatically performed by the merchant device 430. For example, the instruction may be to change sensitivity, exposure time, zoom setting, filtering and/or flash setting on the camera 436. In this example, the recommendation may be in the form of a user notification and the instruction may be performed automatically without user intervention.

The recommendations may be generated based on the comparing of the one or more baseline image features to one or more image features of the image data of the particular product and this may be done using a look-up table. When one or more image features of the image data of the particular product are outside of the threshold specified in the look-up table, the image feature is considered to be inconsistent with the baseline image feature and thus would generate an image that is inconsistent with the one or more previously-captured images in the collection. A recommendation is thus generated to bring that image feature within the threshold of the corresponding baseline image feature. Referring to the look-up table 500 of FIG. 5 by way of example, the average value of the size of a coffee mug in the images of one or more products in the collection "coffee mugs" may be calculated as 70%. The threshold is 2% and this indicates that any size of mug between 68% and 72% is considered close enough to the average value to be considered consistent. If the size of the particular product, or coffee mug, in the image data of the particular product is 60%, then the product image recommendations engine 402 could generate a recommendation to zoom-in the camera or to bring the camera closer to the particular product.

As mentioned, the one or more recommendations are generated for display together with the camera live stream on the user device. The user device may be instructed to display the recommendation on a display screen thereof. The recommendation may be displayed in association with the camera live stream. The recommendation may inform the merchant that the image of the particular product is inconsistent with the one or more previously-obtained images in the collection. The recommendation may instruct the merchant to adjust one or more capabilities, settings or conditions to adjust the image to ensure that one or more image features are consistent with image features of one or more images within the collection. In an event where more than one product is identified, the recommendation may include requesting the user to select which product to be imaged and/or may suggest that the user remove the other identified products from the background.

Figure 9:
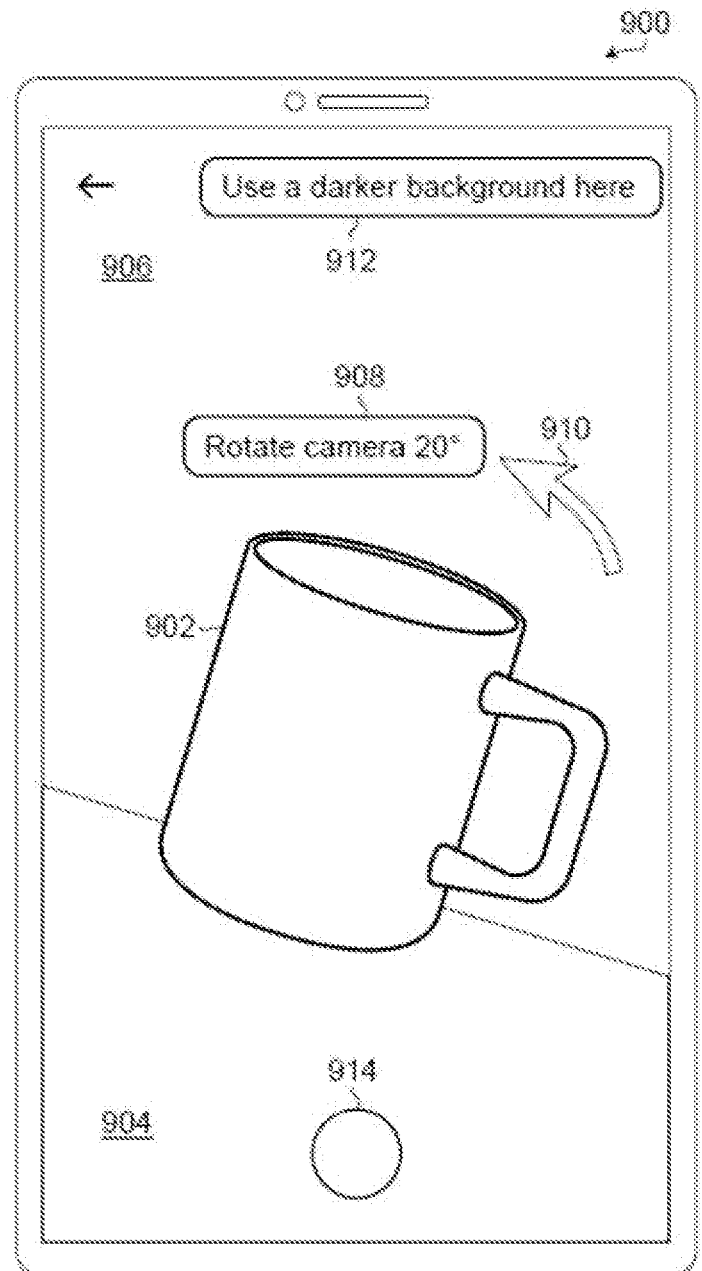
FIG. 9 illustrates a screen page according to an embodiment.

The recommendations may include at least one of a shape, text, image of a related product, or an animation. The recommendation may be overlaid or superimposed with the camera live stream on the user device to help the user visualize the recommendation. The recommendation may be displayed on a screen page. An example screen page 900 is shown in FIG. 9. As can be seen, the screen page 900 includes a viewfinder of a camera. The camera is being used to capture an image of a coffee mug 902 which is resting on a surface 904 in front of a background 906. The screen page 900 includes a button 914 that allows the user to capture and save the image that is shown in the screen page 900. The recommendations 908, 910, 912 are overlaid or superimposed with the camera live stream to help the user better visualize the recommendations.

The recommendations 908, 910 relate to rotating the camera relative to the coffee mug by 20°. Specifically, the recommendation 908 includes text that instructs the user to rotate the camera by 20° and the recommendation 910 is an arrow to help the user visualize how the camera should be rotated. The recommendation 910 may be an animated arrow that continuously extends in the direction it is pointing to. These recommendations may be generated by comparing the tilt image feature of the image data of the particular product to the baseline tilt image feature in look-up table 500.

The recommendation 912 includes text that instructs the user to use a darker background. The recommendation 912 may be generated by comparing the contrast image feature of the image data of the particular product to the baseline contrast image feature.

Figure 10:
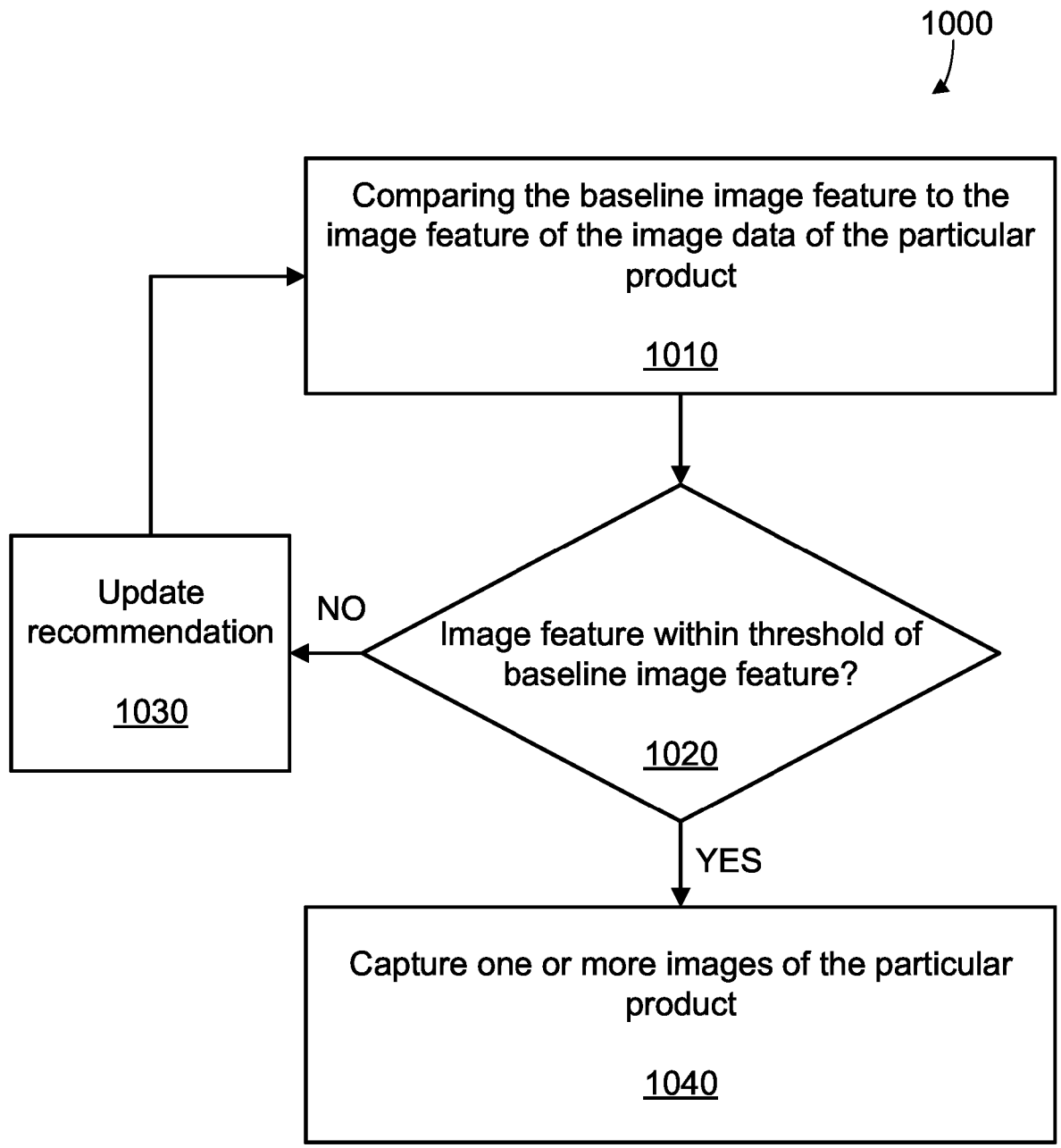
FIG. 10 is a flowchart illustrating an example method capturing one or more images according to an embodiment.

Based on the recommendations 908, 910, 912, the user could reorient the camera and change the background. The recommendations may be actively updated and the comparing and generating steps of method 600 may be repeated until the image features are within the threshold of the corresponding baseline image features. This may be done according to a method 1000 shown in FIG. 10. The method 1000 may be implemented by a computing device having suitable computer-executable instructions for causing the computing device to carry out the described operations. The instructions may be implemented by way of an application executing on a computing device. The method 1000 may be implemented, in whole or in part, by a user device such as the merchant device 430 (FIG. 4). The merchant device 430 (FIG. 4) may utilize the product image recommendations engine 402. In some implementations, the user device may off-load at least some operations of the method 1000 to an external device such as for example to a server that may be part of the product image recommendations engine 402 (FIG. 4) or an e-commerce platform.

Method 1000 includes comparing the baseline image feature to the current image feature of the image data of the particular product (step 1010). In this embodiment, the image feature of the image data of the particular product may be determined continuously in a manner similar to that described herein with reference to step 630.

A check is performed to determine if the image feature is within the threshold of the baseline image feature (step 1020). When it is determined that the image feature is not within the threshold of the baseline image feature, the recommendation may be updated (step 1030) and the method returns to step 1010 where the baseline image feature is compared to the updated image feature.

When it is determined, during step 1020, that the image feature is within the threshold of the baseline image feature, the corresponding recommendation may be removed or otherwise disappear and one or more images of the particular product are captured (step 1040). In this embodiment, the captured image may be obtained from a frame of the live feed or may be captured as a static image. The capture event may be triggered by receipt of an instruction, e.g. a button press or screen tap. For example, the user may select the button 914 of screen page 900 to capture the image.

In an example, the capture event may only be available when the one or more image features are within the threshold of the corresponding baseline image features. For example, the button 914 of screen page 900 may be deactivated until the one or more image features are within the threshold of the corresponding baseline image features.

In another embodiment, the capture event may be automatic. For example, data may be obtained from one or more sensors associated with the user device. The data may be analyzed to determine when the user device is still or not moving. When it is determined that the user device is still for a certain period of time, one or more images may be automatically captured without further input from the user.

The captured image or images may be available for display on a screen page on the user device for review. The screen page may include one or more selectable options to accept the image or to re-take the image. When the image is accepted, the image may be stored in memory. The screen page may include additional recommendations generated based on the methods described herein. For example, the obtained image may be analyzed to determine if one or more image features are still considered to be inconsistent. As another example, after an image is obtained, the user may be provided with a selectable option to reduce the thresholds in the look-up table. When the user selects the selectable option, the thresholds may be updated or otherwise reduced and the user may be prompted to take another picture with the reduced thresholds to obtain an even more consistent image.

Figure 11:
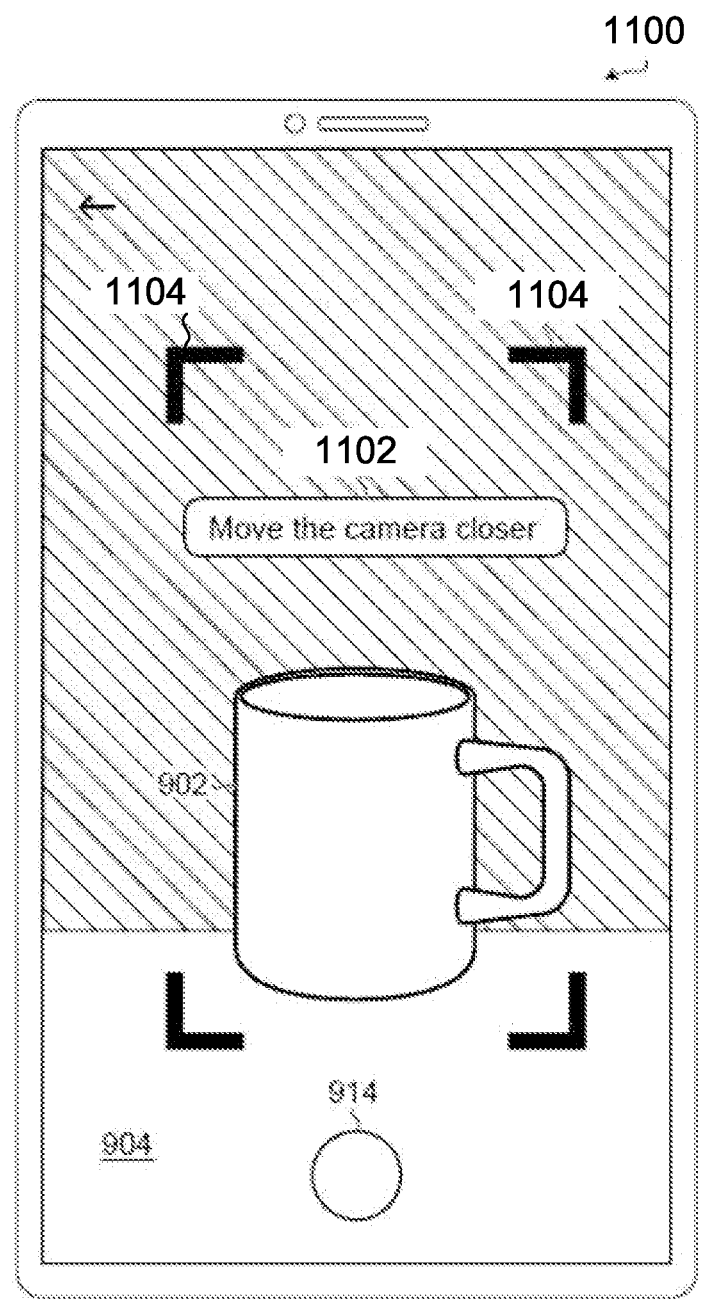
FIG. 11 illustrates a screen page according to an embodiment.

Another example screen page 1100 is shown in FIG. 11 that displays multiple recommendations 1102, 1104 simultaneously with a live camera stream. The recommendations 1102, 1104 relate to the size of the product (coffee mug 902) in the image. For example, using methods described herein, it may be determined that the coffee mug is too small compared to the corresponding baseline image feature in that it occupies too few pixels in the image. As such, the recommendation 1102 includes text instructing the user to move the camera closer to the coffee mug 902. The recommendation 1104 includes a box, outline or handle that helps the user visualize the size of the coffee mug 902 based on the corresponding baseline image feature. The user may move the camera closer to the coffee mug 902 until the coffee mug 902 fills the box. The recommendations 1102, 1104 may then disappear from the screen page and an image may be captured.

Figure 12:
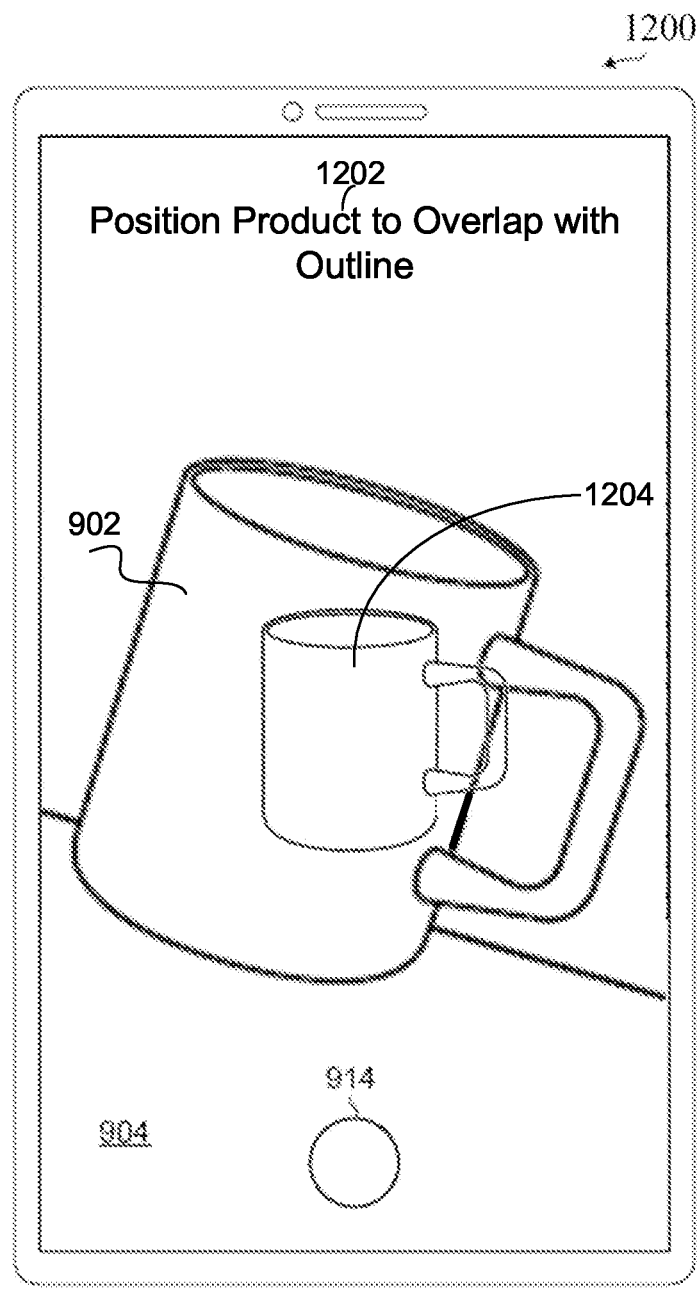
FIG. 12 illustrates a screen page according to an embodiment.

Another example screen page 1200 is shown in FIG. 12 that displays recommendations 1202, 1204 simultaneously with a live camera stream. The recommendations 1202, 1204 relate to the size of the product (coffee mug 902) in the image and the angle of the product in the image. The recommendation 1202 includes text instructing the user to move the camera such that the coffee mug 902 generally overlaps with the recommendation 1204. The recommendation 1204 includes an image of a coffee mug based on the baseline image feature of size of the product in the image. The recommendation 1204 may be a cut-out obtained from a previously-captured image within the collection. The recommendation 1204 is semi-transparent in that the user is able to see the coffee mug 902 when it is overlapped with the recommendation 1204.

In another embodiment, handles may be displayed around identified corners of the product. For example, the example screen page 1200 may include handles around identified corners of the coffee mug 902 and the recommendation 1204. In this manner, the user may adjust one or more image features until the handles of the coffee mug 902 and the handles of the recommendation 1204 overlap.

In another embodiment, rather than showing a recommendation in the form of an image of a coffee mug (such as recommendation 1204 shown in FIG. 12), the recommendation may be in the form of handles identifying where corners of the product to be image should be positioned. In this manner, the user may adjust one or more image features until the handles of the coffee mug 902 and the displayed handles overlap.

It will be appreciated that in at least some embodiments, recommendations may be provided when image capture is initiated. For example, when image capture is initiated, a recommendation may be automatically overlaid on the live camera stream indicating a size of the product based on the corresponding baseline image feature of the images of one or more products in the collection. The recommendation may be, for example, similar to the recommendation 1104 shown in FIG. 11 or recommendation 1204 shown in FIG. 12. In this manner, the user is provided with an initial recommendation indicating the baseline image feature of the size of the product in the image.

It will be appreciated that in at least some embodiments, the recommendations may include feedback to the user indicating progress and/or success. For example, the recommendation may request that the user adjust the angle of the user device to adjust the image feature of the angle of the product in the image. As the user adjusts the angle of the user device, the current angle of the product in the image may be displayed along with the corresponding baseline image feature. As the angle of the user device is further adjusted, the current angle of the product in the image may be updated until the user has adjusted the angle to within the threshold of the corresponding baseline image feature. When the angle of the product in the image is within the threshold of the baseline image feature, a notification may be displayed to the user indicating success.

In at least some embodiments, recommendations may include a progress bar indicating progress by the user in adjusting the one or more image features. For example, the recommendation may request that the user adjust the angle of the user device to adjust the image feature of the angle of the product in the image. As the user rotates the user device, a progress bar may be displayed to update progress of the user in rotating the user device. The progress bar may be shown as full when the angle of the product in the image is within the threshold of the baseline image feature.

In at least some embodiments, an alert or other feedback may be provided to the user indicating success in adjusting an image feature. For example, the user device may be caused to vibrate or output an audible alert indicating success.

In at least some embodiments, the product image may be three-dimensional and as such the user device may include, for example, a three-dimensional camera. In this embodiment, recommendations may be provided based on capturing a three-dimensional product image. For example, the recommendations may include recommendations to physically move the three-dimensional camera around the product.

In at least some embodiments, product images may be part of a product video. In this embodiment, recommendations may be provided based on capturing a product video. For example, the recommendations may include recommendations on how to move the camera and/or product during video capture.

It will be understood that some of the steps of the example methods described herein may be performed in a different order or simultaneously without materially impacting the operation thereof.

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A computer-implemented method comprising:
   obtaining a camera live stream from a camera in a user device, the camera live stream including image data of a particular product;
   determining one or more image features common to images of one or more products based at least on image analysis of image data of the images of the one or more products;
   comparing the one or more image features to one or more image features of the image data of the particular product to generate one or more potential adjustments to the one or more image features of the image data of the particular product; and
   providing, for presentation together with the camera live stream on the user device, at least one indication based on the one or more potential adjustments to the one or more image features of the image data of the particular product.

2. The computer-implemented method of claim 1, wherein the one or more potential adjustments include one or more potential adjustments to adjust the one or more image features of the image data of the particular product.

3. The computer-implemented method of claim 1, further comprising:
   repeating the comparing and the providing until the one or more image features of the image data of the particular product are within a threshold value of the one or more image features common to the images of the one or more products.

4. The computer-implemented method of claim 3, further comprising:
   responsive to the one or more image features of the image data of the particular product being within the threshold value of the one or more image features common to the images of the one or more products, causing the user device to capture one or more images of the particular product.

5. The computer-implemented method of claim 1, further comprising:
   analyzing the image data of the particular product to identify the particular product; and
   obtaining images of the one or more products based on the identified particular product.

6. The computer-implemented method of claim 1, further comprising:
   prior to obtaining the camera live stream, obtaining information regarding the particular product; and
   obtaining images of the one or more products based on the information regarding the particular product.

7. The computer-implemented method of claim 1, wherein the images of the one or more products are images previously captured by the user.

8. The computer-implemented method of claim 1, wherein the potential adjustments are generated for capturing a further image of the particular product more consistent with the image features common to the images of the one or more products.

9. The computer-implemented method of claim 1, wherein the image features include at least one of image resolution, pixel density, image brightness, depth of field, focus, size of product in the image, angle of product in the image, orientation of product in the image, or contrast between the product and the background.

10. The computer-implemented method of claim 1, wherein the at least one indication includes at least one of a shape, text, an image of a related product, or an animation.

11. A system comprising:
    one or more processors;
    processor-readable storage medium containing processor-executable instructions that, when executed by the one or more processors, are to cause the one or more processors to:
    obtain a camera live stream from a camera in a user device, the camera live stream including image data of a particular product;
    determine one or more image features common to images of one or more products based at least on image analysis of image data of the images of the one or more products;
    compare the one or more image features to one or more image features of the image data of the particular product to generate one or more potential adjustments to the one or more image features of the image data of the particular product; and
    provide, for presentation together with the camera live stream on the user device, at least one indication based on the one or more potential adjustments to the one or more image features of the image data of the particular product.

12. The system of claim 11, wherein the one or more potential adjustments include one or more potential adjustments to adjust the one or more image features of the image data of the particular product.

13. The system of claim 11, wherein the processor-executable instructions, when executed by the one or more processors, are to further cause the one or more processors to:
  repeat the comparing and the providing until the one or more image features of the image data of the particular product are within a threshold value of the one or more image features common to the images of the one or more products.

14. The system of claim 13, wherein the processor-executable instructions, when executed by the one or more processors, are to further cause the one or more processors to:
  responsive to the one or more image features of the image data of the particular product being within the threshold value of the one or more image features common to the images of the one or more products, cause the user device to capture one or more images of the particular product.

15. The system of claim 11, wherein the processor-executable instructions, when executed by the one or more processors, are to further cause the one or more processors to:
  analyze the image data of the particular product to identify the particular product; and
  obtain images of the one or more products based on the identified particular product.

16. The system of claim 11, wherein the processor-executable instructions, when executed by the one or more processors, are to further cause the one or more processors to:
  prior to obtaining the camera live stream, obtain information regarding the particular product; and
  obtain images of the one or more products based on the information regarding the particular product.

17. The system of claim 11, wherein the images of the one or more products are images previously captured by the user.

18. The system of claim 11, wherein the potential adjustments are generated for capturing a further image of the particular product more consistent with the image features common to the images of the one or more products.

19. The system of claim 11, further comprising:
  the user device, the user device comprising:
    the one or more processors;
    a display coupled to the one or more processors; and
    the camera, the camera including an image sensor and providing the live camera stream to the one or more processors.

20. A non-transitory computer-readable medium storing processor-executable instructions that, when executed by one or more processors, are to cause the one or more processors to:
  obtain a camera live stream from a camera in a user device, the camera live stream including image data of a particular product;
  determine one or more image features common to images of one or more products based at least on image analysis of image data of the images of the one or more products;
  compare the one or more image features to one or more image features of the image data of the particular product to generate one or more potential adjustments to the one or more image features of the image data of the particular product; and
  provide, for presentation together with the camera live stream on the user device, at least one indication based on the one or more potential adjustments to the one or more image features of the image data of the particular product.

* * * * *